United States Patent [19]

Carson

[11] Patent Number: 4,572,366

[45] Date of Patent: Feb. 25, 1986

[54] APPARATUS FOR STORING, CARRYING AND SHAKING DOWN A CLINICAL THERMOMETER

[76] Inventor: Ralph Carson, 6 Banbury La., Commack, N.Y. 11725

[21] Appl. No.: 659,628

[22] Filed: Oct. 11, 1984

[51] Int. Cl.⁴ ............................................. B65D 85/38
[52] U.S. Cl. ..................................... 206/306; 220/306
[58] Field of Search ............... 206/306, 459; 220/375; 215/306; 273/58 C

[56] References Cited

U.S. PATENT DOCUMENTS

| | | | |
|---|---|---|---|
| 990,325 | 4/1911 | Winn | 206/306 |
| 1,172,117 | 2/1916 | Dickinson | 206/306 |
| 1,614,807 | 1/1927 | Stewart | 206/306 |
| 1,764,987 | 6/1930 | Schwartz | 206/306 |
| 2,287,366 | 6/1942 | Younghusbands | 220/375 |
| 2,363,602 | 11/1944 | Lichten | 220/375 |
| 2,737,312 | 3/1956 | Hamlon | 220/375 |
| 2,955,468 | 10/1960 | Hein, Jr. | 215/306 |
| 3,100,044 | 8/1963 | Gardner | 206/306 |
| 3,495,697 | 2/1970 | Catelli | 206/306 |

FOREIGN PATENT DOCUMENTS

| | | | |
|---|---|---|---|
| 2016717 | 11/1977 | Fed. Rep. of Germany | 273/58 C |
| 498610 | 9/1954 | Italy | 220/375 |
| 1422 | 1/1898 | United Kingdom | 206/306 |
| 5535 | 3/1909 | United Kingdom | 206/306 |
| 267272 | 3/1927 | United Kingdom | 206/306 |
| 372420 | 5/1932 | United Kingdom | 220/375 |

*Primary Examiner*—William T. Dixson, Jr.
*Assistant Examiner*—Brenda J. Ehrhardt
*Attorney, Agent, or Firm*—Anthony J. Casella; Gerald E. Hespos

[57] ABSTRACT

An apparatus is provided for storing, protecting, carrying and shaking down a thermometer. The apparatus includes hollow generally cylindrical base and cover members which are engageable with one another and are adapted to enclose a thermometer. An elastic member extends through and is secured to the cover. An elastic retention member and cap grasp the elastic member adjacent the top of the apparatus. The cap can be grasped by thumb and forefinger to enable the remainder of the apparatus to be rotated around the elastic member.

6 Claims, 11 Drawing Figures

APPARATUS FOR STORING, CARRYING AND SHAKING DOWN A CLINICAL THERMOMETER

BACKGROUND OF THE INVENTION

A thermometer for measuring body temperature is formed from a fragile glass tube with a narrow internal passage. One end of the glass tube is closed and the other end is in communication with a bulb containing mercury. The glass tube is calibrated to measure the amount of thermal expansion of the mercury as a function of temperature.

Storage of the thermometer often is troublesome because of the fragile nature of the glass tube. The thermometer may be stored in a supported stand, in a cylindrical container formed from a material that is less fragile than the thermometer itself, or merely in an isolated location where the thermometer is not likely to be damaged.

Thermometers used to measure body temperature are generally designated as clinical thermometers. Glass clinical thermometers are precision instruments which must be produced and tested to rigid standards (e.g. ASTM E667-81). A design feature of a glass clinical thermometer is a constriction in the bore located between the bulb and the lowest graduation. The purpose of the constriction is to retain the mercury column at the highest level recorded, permitting the operator to read accurately the correct temperature recorded.

Without this feature, the mercury column would retreat into the bulb in response to lower temperatures and this could affect the accuracy of the reading. This design feature, while necessary, creates a problem for the operator inasmuch as the mercury must be forcibly "shaken down" into the bulb reservoir prior to the next use of the thermometer. Typically this is accomplished by holding the thermometer at the end opposite to the bulb and shaking the thermometer vigorously with a downward force. This causes the mercury column to at least partially withdraw into the bulb.

Many individuals, professionals and lay personnel alike, have tremendous difficulty shaking the clinical thermometer with sufficient force to cause the mercury to withdraw into the bulb. In general, people elect to measure their own temperature only when they are not feeling well, and it is during these periods of ill health that an individual would feel least like vigorously snapping their wrist to shake-down a thermometer. This vigorous shaking often is very painful for elderly people or for people afflicted with arthritis or a similar ailment in their wrist, elbow or shoulder. Women often experience more difficulty then men in exerting the force needed to shake down a clinical thermometer by traditional methods. However, women (e.g. mothers or nurses) often are called upon to perform this task In response to the problems associated with the difficult to shake-down standard clinical thermometer, hospitals and some doctors have begun using electrical temperature probes. Although these devices do not require a manual shake-down after each use, they are far too expensive for most households and many doctors offices. Furthermore they are no more accurate than glass thermometers, and just as vulnerable to damage.

In view of the above, it is an object of the subject invention to provide an apparatus to enable the safe storage of a glass clinical thermometer and to facilitate the shaking down of the mercury therein.

It is another object of the subject invention to provide an apparatus for storing and shaking down a glass clinical thermometer that can be manufactured easily and at a low cost.

It is an additional object of the subject invention to provide an apparatus for storing and shaking down a thermometer that can readily be carried and manipulated by the user.

It is a further object of the subject invention to provide an apparatus for storing and shaking down a thermometer which does not require violent snapping of the wrist to lower the mercury level in the thermometer.

SUMMARY OF THE INVENTION

The apparatus of the subject invention comprises a generally tubular cylindrical base with a closed bottom end and an open top end. The length of the cylindrical base should be less than the length of the thermometer. The opened end of the base includes a means for securely retaining a cover as explained further below. Preferably the means for securely retaining a cover comprises an array of external threads disposed adjacent the open end of the base.

The open end of the base also is provided with an internally mounted shock absorbing collar. Although the shock absorbing collar may be unitary with the base, it is preferred that the collar define a separate member securely engaged adjacent the open end. More particularly, the shock absorbing collar may be a generally cylindrical member dimensioned to fit within the base. One end of this generally cylindrical shock absorbing collar is defined by a plurality of inwardly extending fingers. The opposed end of the collar preferably includes an outwardly extending annular ridge to prevent the shock absorbing collar from sliding entirely within the base. The shock absorbing collar can be retained in the base by a frictional engagement or by an appropriate application of adhesive. Preferably the shock absorbing collar is color coded or provided with appropriate indicia to identify whether the clinical thermometer is for oral or rectal use. In certain institutional applications, the color coded collar can be used to convey other information, such as a particular ward, or patient.

A generally cylindrical tubular cover member is provided to securely engage the open end of the base. More particularly the generally cylindrical cover preferably includes an open bottom end having an array of threads dimensioned to engage the threads on the base. The top end of the generally cylindrical cover also preferably is open.

The cover of the subject apparatus is further defined by an inwardly extending annular shoulder intermediate the two ends thereof. The annular shoulder is dimensioned to define an aperture connecting the opposed ends of the generally tubular cover. The aperture preferably is smaller than the external diameter of the thermometer and thus the shoulder functions as a stop for axial movement of the thermometer. As explained further below, an elastic means, such as an elastic cord is extended into the aperture but is prevented from passing entirely therethrough by an appropriate stop, such as a knot or a metallic ball secured to the end of the cord. The extreme top end of the cover is opened as indicated above, and defines a recess extending to the annular shoulder of the cover.

An elastic retention member is provided for mounting in the recess at the top end of the cover. More particularly the elastic retention member is of generally cylindrical tubular construction, and includes a centrally aligned aperture extending therethrough. One end of the elastic retention member is dimensioned to be slideably inserted into the recess in the cap adjacent the top end thereof. Preferably both the recess and the corresponding end of the elastic retention member are cylindrical. Additionally, the fit between the recess and the retention member should enable easy insertion in and removal of the elastic retention member. Preferably a collar is disposed intermediate the opposed ends of the elastic retention member to limit the degree of relative axial movement between the elastic retention member and the cover.

It also is preferred that the opposed end of the elastic retention member be provided with at least one slot dimensioned to accept the elastic means inserted therethrough. The elastic retention member also preferably includes a means for securely retaining the cap. Preferably this means includes an annular groove. The elastic retention member also may be color coded for the reasons explained above with respect to the shock absorbing collar.

A closed end cap dimensioned to fit over the end of the elastic retention member also is provided. Preferably the closed end cap includes an inwardly extending annular ridge adjacent the open end thereof. The annular ridge is adapted to be securely retained in the annular groove on the elastic retention member. The cap further can include an axially extending projection to extend within the elastic retention member further securing the elastic means. The cap also can be in the form of a ring to facilitate retention and use of the apparatus by people with diminished gripping power.

The subject apparatus is assembled by passing the elastic means through the cover of the container, and more particularly through the central aperture defined by the inwardly extending shoulder in the cover. The elastic means is prevented from passing entirely through the aperture in the cover by an appropriate means such as a knot or metallic ball. The elastic means is then further extended through the elastic retention member. Upon complete extension of the elastic means through the elastic retention member, the elastic means is bent through an angle approaching 180° so as to be retained in the notch in the end of the elastic retention member. The cap then is slideably inserted over the elastic retention member in an axial direction, and a sufficient force is exerted on the cap to cause the inwardly extending annular ridge to engage the annular groove on the elastic retention member. The dimensions of the elastic retention member and the cap are such that the elastic means will be securely retained between the elastic retention member and the cap. The dimension of the elastic means is such that the elastic will bias the elastic retention member into the recess of the top end of the cover member. However, the elastic means should be sufficiently expandable to enable the entire elastic retention member to be removed easily from the recess.

The subject container is used by placing the thermometer in the base portion, bulb end first. The cover member then is securely attached to the base. The shock absorbing collar efficiently prevents damage to the thermometer stored in the subject container. Prior to use of the thermometer, the mercury therein can be shaken down by merely holding the cap and rotating the remainder of the container relative to the cap. The elastic means stretches causing the cap and the associated elastic retention member to be removed from the recess in the top end of the cover. The elastic means also provides the connection between the centrally disposed cap and the rotating base and cover members. The resulting centrifugal forces cause the mercury in the thermometer to recede toward the bulb. A few seconds of rotating the container about the cap in this manner generally is sufficient to lower the mercury. After rotation has stopped the elastic will bias the cap back toward the cover. This rotation can be easily accomplished without the forceful wrist snapping that previously had been required. The subject container can be made relative inexpensively from plastic materials, thereby providing a substantial cost advantage over the sophisticated electrical temperature probes used in hospitals or in doctor's offices.

PREFERRED DESCRIPTION OF THE PREFERRED EMBODIMENT

Figure 1:
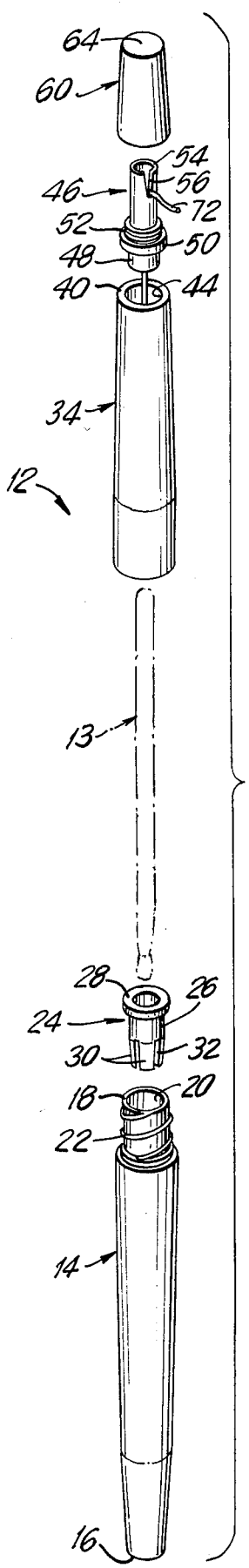
FIG. 1 is an exploded perspective view of the apparatus of the subject invention for storing and shaking down a thermometer.
Figure 2:
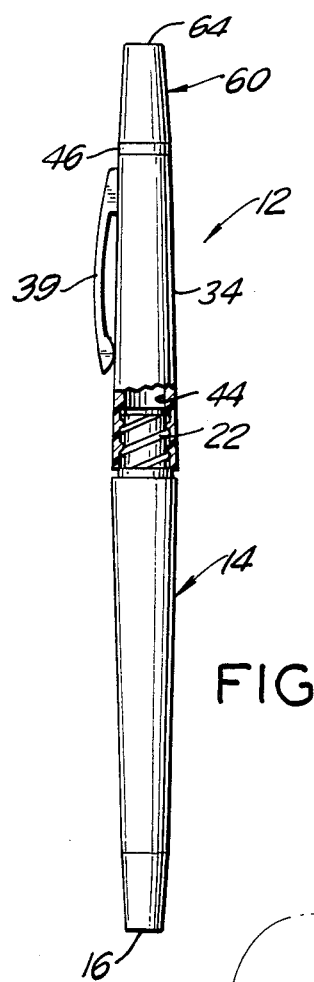
FIG. 2 is a cross-sectional view of the assembled apparatus shown in FIG. 1.
Figure 3:
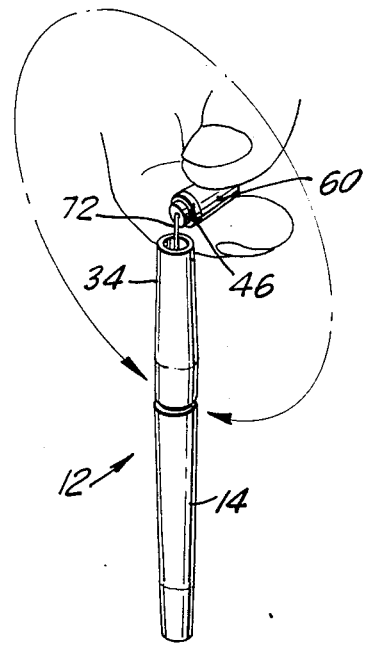
FIG. 3 is a perspective view showing the subject apparatus in use.
Figure 4:
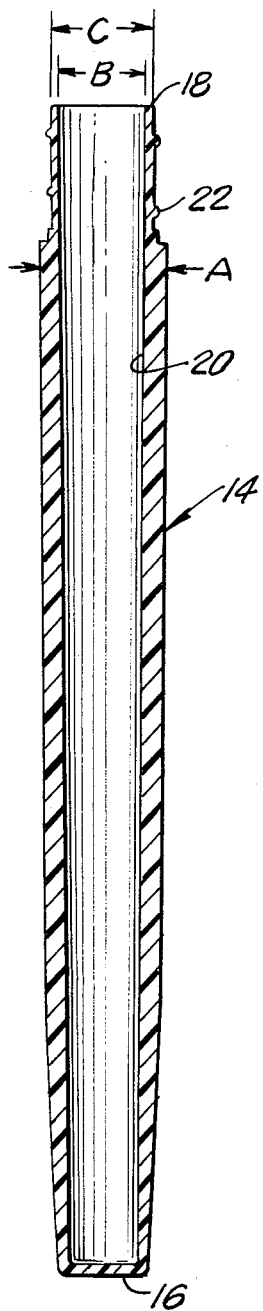
FIG. 4 is a cross-sectional of the base portion of the subject apparatus.

The apparatus of the subject invention, as indicated generally by the numeral 12 in FIGS. 1 through 3, is adapted to retain a thermometer indicated by the numeral 13 in FIG. 1. The apparatus 12 is of generally hollow cylindrical construction such that the thermometer 13 can readily fit therein.

As shown in FIGS. 1 through 4, the apparatus includes a generally cylindrical base 14 having a closed bottom end 16, an open top end 18 and a hollow generally cylindrical internal compartment 20 extending from the open end 18 toward the closed end 16 thereof. The outside of base 14 adjacent the open end 18 thereof is characterized by an array of external threads 22. The base 14 can be tapered slightly adjacent bottom 16, as illustrated more clearly in FIG. 4. The maximum outside diameter of the base 14 is indicated by dimension "A" in FIG. 4, and is disposed substantially adjacent the array of external threads 22. The diameter of internal compartment 20 is indicated by dimension "B" in FIG. 4, and is greater than the diameter of the thermometer 13 to be stored in the apparatus 12. The outside diameter of the base 14 adjacent end 18 thereof is indicated by dimension "C" in FIG. 4. Preferably the base 14 is of unitary construction and is formed from a molded plastic material.

Figure 5:
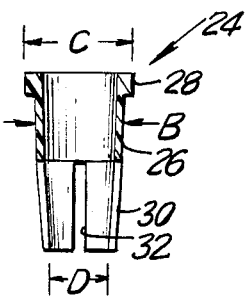
FIG. 5 is a cross-sectional view of the shock absorbing collar of the subject apparatus.
Figure 6:
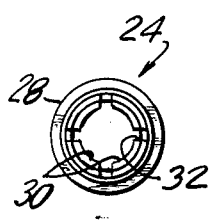
FIG. 6 is a top view of the shock absorbing collar shown in FIG. 5.

Turning to FIGS. 5 and 6, the apparatus 12 is provided with a shock absorbing collar 24. The shock absorbing collar 24 is of generally tubular cylindrical configuration and also preferably is formed from molded plastic. The collar 24 can be of a color which corresponds to a particular type of use (e.g. oral or rectal). More particularly, the collar 24 includes a central portion 26 having an external diameter "B" substantially equal to the internal diameter of the base 14. Thus, the shock absorbing collar 24 can be slideably inserted into base 14, as shown in FIG. 1, with the external cylindrical wall of central portion 26 being frictionally engaged by the internal walls of compartment 20 in base 14. The shock absorbing collar further is provided with an annular ridge 28 having an external diameter "C" substantially equal to the external diameter of base 14 adjacent open end 18 thereof. The annular ridge 28 prevents the shock absorbing collar 24 from moving too far into the inner compartment 20 of base 14. However, the outer diameter "C" of the annular ridge 28 also insures that the shock absorbing collar 24 will not interfere with the secure mounting of the cover of the apparatus 12 as explained further herein.

The shock absorbing collar 24 further is provided with a plurality of shock absorbing fingers 30. The fingers 30 are separated from one another by generally axially aligned slits 32. As a result of this construction, the fingers define a minimum inner diameter "D" at the end of the shock absorbing collar 24 opposite annular ridge 28. The diameter "D" preferably is only slightly greater than the diameter of the thermometer 13. The shock absorbing fingers 30 function to dampen any shocks on the apparatus 12 thereby protecting the thermometer 13.

Figure 7:
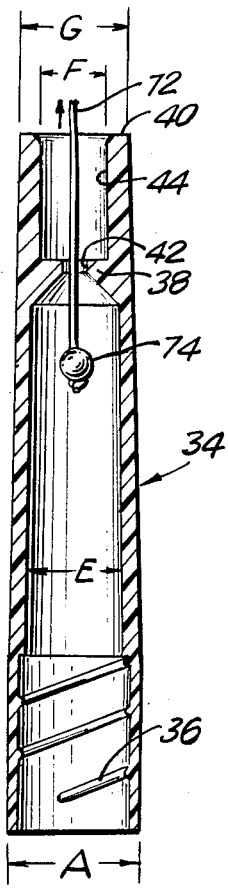
FIG. 7 is a cross-sectional view of the cap member of the apparatus of the subject invention.

The apparatus 12 also is provided with a cover 34 as illustrated most clearly in FIG. 7. The cover 34 is a molded plastic member of generally hollow cylindrical construction and includes an array of internal threads 36 adjacent the bottom end thereof. The internal threads 36 are dimensioned to threadably mate with the external threads 22 on base 14. The cover 34 can be tapered as illustrated in the FIGS., but preferably is provided with an external diameter "A" adjacent the internal threads 36, substantially equal to the diameter "A" of the base 14 adjacent the external threads 22 thereof. The internal diameter of the portion of cover 34 spaced from the threads 36 is indicated by dimension "E" and is greater than the diameter of the thermometer 13 to be placed in the apparatus 12. Preferably, dimension "E" is approximately equal to dimension "B" on the base 14.

The cover 34 also is provided with an inwardly extending annular shoulder 38. The location of annular shoulder 38 is such that on the assembled apparatus 12, the distance between the end 16 of base 14 and the shoulder 38 of cover 34 is greater than the length of thermometer 13. Additionally, the shoulder 38 is spaced from the end 40 of cover 34 opposite the threads 36. The annular shoulder 38 is formed to define an aperture 42 which effectively connects the opposed ends of the cover 34. The portion of cover 34 intermediate the end 40 and the annular shoulder 38 defines a generally cylindrical recess 44 with an internal diameter "F" as shown in FIG. 7. The outside diameter of cover 34 at end 40 thereof is indicated by dimension "G". Preferably, as illustrated in FIG. 2, the cover 34 is provided with a mounting pen clip 39 to facilitate the safe carrying of the apparatus.

Figure 8:
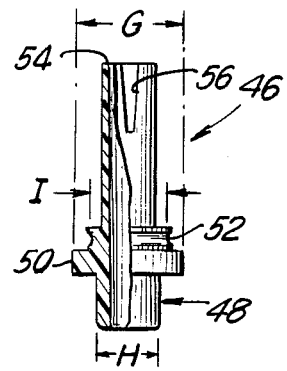
FIG. 8 is a cross-sectional view of the elastic retention member of the subject invention.
Figure 9:
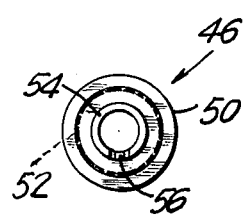
FIG. 9 is a top view of the elastic retention member shown in FIG. 8.

Turning to FIGS. 8 and 9, the apparatus further includes an elastic retention member 46, which also may be color coded as explained above. The elastic retention member 46 is of generally tubular construction, with a cylindrical plug 48 adjacent one end thereof. The plug 48 has an external diameter "H" which is slightly less than the internal diameter "F" of the recess 44 in cover 34. On the assembled apparatus 12, the plug 48 is slideably inserted into the recess 44, but is easily removable therefrom.

Adjacent the plug 48 is an annular collar 50 having an external diameter "G" substantially equal to the external diameter of the cover 34 adjacent top end 40 thereof. The collar 50 is provided to limit the axial movement of elastic retention member 46 relative to the recess 44 in cover 34. Additionally, collar 50 provides a stop against which the cap of the subject apparatus rests as explained further below.

The elastic retention member further is provided with an annular inwardly extending groove 52 on the portion thereof adjacent collar 50. The diameter defined by the radially innermost portion of the groove 52 is indicated by dimension "I" in FIG. 8. The end 54 of elastic retention member 46 opposite plug 48 is characterized by a generally V-shaped elastic retention slot 56. On the assembled apparatus 12, an elastic member is engaged in slot 56 as shown most clearly in FIG. 1.

Figure 10:
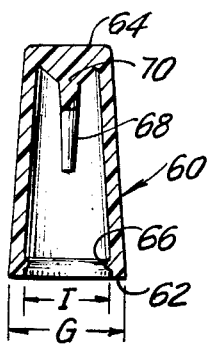
FIG. 10 is a cross-sectional view of the cap of the apparatus of the subject invention.

The cap of the subject invention is indicated generally by the numeral 60 in FIG. 10. The cap 60 includes an open end 62 and a closed end 64. The open end 62 has an external diameter "G" substantially equal to the diameter of collar 50 and the diameter of cover 34 adjacent end 40 thereof. End 62 of cap 60 is characterized by an annular inwardly extending ridge 66 dimensioned to snap into engagement with the annular groove 52 on the elastic retention member 46. More particularly, the innermost diameter of ridge 66 is substantially equal to the inner diameter "I" of the annular groove 52 on the elastic retention member 46. Thus, as the cap 60 is advanced axially over the elastic retention member 46, a sufficient axial force will cause the ridge 66 to engage the groove 52. The cap 60 is further provided with an axially aligned projection 68 which terminates at a frusto—conical support 70 adjacent end 64 of cap 60. When the cap 60 is engaged over the elastic retention member 46, the axial member 68 and its frusto-conical support 70 will advance centrally within elastic retention member 46 and help to retain the elastic mounted therein. Additionally, the inner portion of cap 60 is dimensioned to frictionally engage the elastic between cap 60 and the elastic retention member 46.

Figure 11:
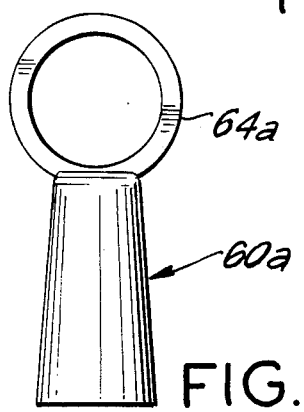
FIG. 11 is an elevational view of an alternate cap.

FIG. 11 shows an alternate cap 60a which includes a ring shaped end 64a. The ring shaped end 64a is dimensioned to receive the user's finger thereby facilitating use of the apparatus by people with diminished gripping power.

An elastic means, such as an elastic cord, also is provided as indicated generally by the numeral 72 in FIG. 1.

The apparatus 12 is assembled by first frictionally or adhesively engaging the shock absorbing collar 24 in the base 14 adjacent end 18 thereof. The elastic means 72 then is advanced partly through the cover 34. More particularly the elastic means 72 is threaded through the aperture 42 in cover 34 going in the direction from the threaded array 36 to the opposed end 40 thereof. The elastic means 72 is provided with an appropriate means for limiting the movement of elastic means 72 through aperture 42. For example, the elastic means 72 can be mounted to a metallic ball 74 as illustrated in FIG. 7. As the elastic means 72 is advanced axially through the cover 34, this axial movement will be limited by the metallic ball 74 contacting the annular shoulder 38. The elastic means 72 then is passed through the elastic retention member 46 from the plug end 48 to the opposed end 54. The elastic means 72 then is bent through an angle approximating 180° and is urged into engagement with the notch 56. The length of the elastic means 72 is such that the elastic means 72 biases elastic retention member 46 toward cover 34 with the plug 48 loosely seated in the recess 44 with the collar 50 being disposed adjacent the end 40 of cover 34. The elastic means 72 is firmly secured in the elastic retention member 46 by urging cap 60 over elastic retention member 46 such that the ridge 66 snaps into engagement with the groove 52. The thermometer 13 can be inserted into the base 14 with the bulb end of the thermometer 13 being substantially adjacent end 16 of base 14. The cover 34 of the apparatus 12 then can be threadably engaged with the base 14 thereof to securely store the thermometer.

The thermometer may be easily and conveniently shaken down by grasping the cap 60 between the thumb and forefinger as illustrated in FIG. 3 and rotating the remainder of apparatus 12. More particularly, as the rotational force is exerted on apparatus 12, the elastic member 72 will stretch causing the plug 48 to withdraw from recess 44 as shown in FIG. 3. As a result, the apparatus can easily be rotated around the elastic member 72. After a few seconds of such rotation the mercury in thermometer 13 will recede into the bulb. The rotation of apparatus 12 then can be stopped and the plug 48 can be allowed to be seated in the recess 44 under the biasing action of elastic member 72.

In summary an apparatus is provided for storing and shaking down a thermometer. The apparatus includes a generally cylindrical base having a closed bottom end and an open externally threaded top end. A shock absorbing collar is inserted into the open top end of the base, and is constructed to protect the thermometer stored therein. A cover is provided to threadably engage the base. The cover includes an inwardly extending annular shoulder intermediate its two ends. The shoulder defines an aperture centrally in the top. The end of the cover opposite the threaded end defines a cylindrical recess. An elastic retention member and cap are provided to securely engage an elastic member. The elastic member is threaded through the aperture in the cover, but is provided with a means, such as a knot or metallic ball, to prevent complete pulling of the elastic member through the aperture. The elastic member also is engaged in the elastic retention member and cap, such that the elastic exerts a biasing force on the elastic retention member and cap biasing a portion of the elastic retention member into the recess in the top. The cap of the subject apparatus can be grasped by a thumb and forefinger, such that a rotational force causes the apparatus to rotate about the elastic member.

While the invention has been described and illustrated with respect to a preferred embodiment, it is obvious that various modifications can be made therein without departing from the spirit of the present invention as defined by the claims.

What is claimed is:

1. An apparatus for storing, carrying and shaking down a clinical thermometer, said apparatus comprising:

a generally tubular base member having a closed bottom end and an open top end, said base member including an array of external threads disposed adjacent the top end thereof;

a generally tubular shock absorbing collar disposed within said base member adjacent the top end thereof, said shock absorbing collar including a plurality of inwardly directed spring fingers;

a generally tubular cover member having opposed open bottom and open top ends, said open bottom end including an array of internal threads engaged with the external threads on said base member, said cover member further including an annular inwardly directed shoulder intermediate said top and bottom ends thereof, said shoulder defining a generally axially aligned aperture in said cover member;

an elastic cord extending through said aperture in said cover, said elastic cord including means disposed intermediate said shoulder and the bottom end of said cover member for preventing complete passage of said elastic cord through said aperture;

a generally tubular elastic retention member including opposed top and bottom ends, said bottom end of said elastic retention member being slideably and removably disposed in the top end of said cover member, said top end of said elastic retention member including a V-shaped elastic retention slot, said elastic cord extending through said elastic retention member and being engaged in said elastic retention slot such that one end of said elastic cord is disposed external to said elastic retention member, and said elastic retention member further including an annular inwardly extending groove intermediate the bottom end thereof and the slot; and a generally cylindrical cap having opposed inner and outer surfaces, a closed top end and an open bottom end, the internal surface of said cap including an inwardly extending annular ridge adjacent the bottom end of said cap, said ridge being frictionally engaged in the annular groove of said elastic retention member, said cap further including an axially aligned frusto-conical support extending from the closed top end toward the opened bottom end thereof, said frusto-conical support and said inner surface of said cap securely engaging said elastic cord both internal and external to said elastic retention member, whereby said elastic cord biases said elastic retention member into said tubular cover and whereby said elastic cord enables said base and said cover to be rotated about said elastic retention member and said cap to shake down the clinical thermometer.

2. An apparatus as in claim 1 wherein said apparatus comprises a plurality of interchangeable shock absorbing collars, each said collar being of a different color, whereby said colors denote characteristics of the thermometer.

3. An apparatus as in claim 1 wherein the cap includes a grip.

4. An apparatus as in claim 3 wherein the grip is ring shaped.

5. An apparatus as in claim 1 further including a mounting clip affixed to the cover.

6. An apparatus as in claim 2 wherein the color of the shock absorbing collar is different from the color of the base.

* * * * *